2,946,648
Patented July 26, 1960

2,946,648

SODIUM XYLENE SULFONATE DIAZONIUM SALT COMPOSITIONS

Clemens Streck, Loudonville, N.Y., assignor to General Aniline & Film Corporation, New York, N.Y., a corporation of Delaware No Drawing. Filed Dec. 20, 1955, Ser. No. 554,128

12 Claims. (Cl. 8—44)

This invention relates to the preparation of diazonium salt compositions, and more particularly to diazonium salt compositions having improved solubility in water.

In the preparation of aromatic diazonium salts for use as diazo components for reaction with azo coupling components in the production of azo dyestuffs, the diazo compound, as produced by diazotization of an aromatic primary amine compound, is generally stabilized by forming (1) a complex double salt of the diazonium chloride with an inorganic salt such as zinc chloride, tin chloride, cadmium chloride, manganese chloride, or sodium fluoroborate, (2) aromatic or aliphatic sulfonates, and (3) certain stable acid salts such as sulfates and chlorides. These are known in the trade as Fast Color Salts (see Saunders, "The Aromatic Diazo Compounds," page 29, London, 1936), and the salts and acids combined therein with the diazonium compounds are known as "Fast Color Salt Stabilizers." While the water solubility of these stable aromatic diazonium salts is generally satisfactory for most purposes, some of such salts are not sufficiently soluble to permit their being used in the higher concentrations usually found necessary for printing purposes and certain types of padding operations. This is particularly true of the zinc chloride double salt of anthraquinone-1-diazonium chloride. About 50 to 100 parts of water are required to dissolve 4 parts of this salt, depending on temperature and other conditions, and the resulting solutions are not sufficiently concentrated to give satisfactory results for printing purposes. In general, solutions of stable aromatic diazonium salts having concentrations of at least about 15%, and preferably at least about 25% by weight are necessary for the attainment of satisfactory results in printing.

It is an object of this invention to increase the water solubility of stable aromatic diazonium salts. Another object of this invention is the provision of compositions containing stable aromatic diazonium salts of improved solubility in water. Still another object of this invention is the provision of more highly concentrated solutions of stable aromatic diazonium salts. Other objects and advantages will appear as the description proceeds.

The attainment of the above objects is made possible by the instant invention which is based upon the discovery that the water solubility of stable aromatic diazonium salts may be improved by admixing therewith about 1 to 120% by weight thereof of sodium xylene sulfonate. The improved water solubilizing effects of sodium xylene sulfonate on stable aromatic diazonium salts is surprisingly and unexpectedly superior to the effects attained by closely related benzene and naphthalene sulfonic acid salts hitherto employed in admixture with stable aromatic diazonium salts.

As a further feature of this invention, it has been found that when higher proportions of sodium xylene sulfonate within the above mentioned range are employed, even better dyeing results are obtained by the addition to the composition of an amount of an acidic substance effective to maintain an aqueous solution of the composition at a pH of from about 3 to 7, the optimum range for coupling with the azoic coupling component. Solid acidic substances may be employed where a dry or solid composition is contemplated, as for example citric acid, oxalic acid, tartaric acid, sodium acid sulfate, and the like. Where the acidic substance is liquid, it may be added to the aqueous solution containing the compositions of the instant invention, representative acids for this use being formic acid, acetic acid, lactic acid, and the like. By way of example, when using citric acid, amounts of up to about 5% based on the weight of the sodium xylene sulfonate are usually sufficient to achieve the above desired results with respect to pH of the aqueous solutions containing the instant compositions. However, the amount of acidic substance to be employed will of course depend primarily upon the particular substance employed and its acidity. While the reason for the improved results obtained by the use of the acidic substances is not clearly understood, it is believed that a buffering action is involved which aids in maintaining proper coupling conditions.

As examples of primary aromatic amine compounds which may be employed as the basis for forming the stable aromatic diazonium salts operative in the instant invention, there may be mentioned aminoazotoluene, 4-chloro-2-nitroaniline, 5-chloro-o-toluidine, 4-nitro-o-toluidine, 2,5-dichloroaniline, 4-benzamido-2,5-diethoxyaniline, 4-nitro-m-anisidine, 4-nitro-o-anisidine, 4-chloro-o-anisidine, 1-aminonaphthalene, 1-aminoanthraquinone, dianisidine, 5-chloro-4-nitro-o-anisidine, aminobenzophenones, aminosulfones such as aminobenzosulfones and aminodiphenylsulfones, aminodiphenyl ethers, aminocarbazoles, and other similar cyclic compounds containing at least one diazotizable primary amine group. These and other carbocyclic and heterocyclic azoic bases operative in the process of this invention are well known in the art.

The above-mentioned primary aromatic amine compounds are diazotized in known manner as for example by treatment with sodium nitrite and acid. The resulting diazo compounds are stabilized in known manner, the stable aromatic diazonium salts being generally available as a hydrochloride or sulfate of one of the relatively stable diazos, as a double salt employing such salts as zinc chloride, zinc sulfate, cadmium chloride, tin tetrachloride, fluoroborates and the like, or as a salt with an organic sulfonic acid such as benzenedisulfonic acid, β-naphthalenesulfonic acid, and naphthalenetrisulfonic acid.

As stated above, sodium xylene sulfonate which is solid, may be employed in amounts of about 1 to 120% by weight of the stable aromatic diazonium salt, the resulting compositions being in a solid state and hence easily handled and marketed. The degree of water solubility attainable by the instant invention will of course depend upon the initial water solubility of the stable aromatic diazonium salt and the amount of sodium xylene sulfonate admixed therewith. If desired, instead of a solid composition containing the stable aromatic diazonium salt and sodium xylene sulfonate, with or without a solid acidic substance as above described, the compositions of the instant invention may be made available as more or less concentrated solutions in water. In this manner, for example, aqueous solutions of the zinc chloride double salt of anthraquinone-1-diazonium chloride may be made available in concentrations of at least about 15% and up to about 35 or 40% by weight, which are eminently satisfactory for use in printing. The compositions of the instant invention may be employed for printing purposes in known manner by admixture with a thickening agent of the usual type, including gums, resins, and the like, to achieve improved printing results. It has also been found that aqueous solutions containing the instant composition, and printing pastes containing the same, have good stability over prolonged periods of time.

If desired, a small amount of a water-soluble nonionic surface active agent may be added to the compositions of the instant invention, improved results with respect to solubility and dyeing results being often attained thereby. Compounds of this type are well known in the art and are disclosed along with suitable methods for their preparation in numerous patents and publications. In general, they may be obtained by condensing a polyglycol ether containing the required number of alkenoxy groups or an alkylene oxide such as propylene oxide, butylene oxide or preferably ethylene oxide with an organic compound containing a reactive hydrogen atom. As such compounds containing a reactive hydrogen atom, there may be mentioned alcohols, phenols, thiols, primary and secondary amines, carboxylic acid and sulfonic acids and their amides. The amount of alkylene oxide condensed with the reactive hydrogen-containing compound, i.e. the length of the polyoxyalkylene chain, will depend primarily upon the particular compound with which it is condensed. As a convenient rule of thumb, approximately 1 mole of ethylene oxide should be employed for each two carbon atoms in the reactive hydrogen-containing compound. Generally, from about 2 to 100 and preferably about 4 to 30 ethylene oxy groups are sufficient. These agents may be employed in amounts of about 0.5 to 15% by weight of the stable aromatic diazonium salt.

The following examples, in which parts are by weight unless otherwise indicated, are illustrative of the instant invention and are not to be regarded as limitative.

*Example 1*

|  | I | II | III |
|---|---|---|---|
| Anthraquinone-1-diazonium chloride zinc chloride double salt.................g.. | 4 | 4 | 4 |
| Sodium xylene sulfonate.......................g.. |  | 3.6 | 3.8 |
| Citric acid.....................................g.. |  | .4 | .2 |
| Water.........................................cc.. | 26 | 22 | 22 |
| Gum tragacanth................................g.. | 70 | 70 | 70 |

I, even though in more dilute solution, does not dissolve, but forms a slurry or partial solution, whereas II and III form clear solutions.

A sample without the citric acid produces a yellower shade of the desired red when printed and developed with Naphthol AS; a higher amount of citric acid produces no further color change. The citric acid can be replaced by formic or acetic acid.

*Example 2*

|  | I | II |
|---|---|---|
| Dianisidine tetrazo zinc chloride double salt.....g.. | 4 | 4 |
| Sodium xylene sulfonate.......................g.. |  | .8 |
| Water.........................................cc.. | 8 | 8 |

I forms a slurry whereas II is a solution stable on storage for several weeks. When thickened with gum tragacanth, printed and developed with an azoic coupling component, II gives clear even prints whereas I gives somewhat splotchy prints.

*Example 3*

|  | I | II |
|---|---|---|
| 4-Benzamido-2,5-diethoxybenzene diazonium zinc chloride double salt...........................g.. | 4 | 4 |
| Sodium xylene sulfonate.......................g.. |  | 4 |
| Water.........................................cc.. | 11 | 11 |

I is a slurry whereas II is a solution. On thickening, printing and developing with an azoic coupling component, II gives clearer, more even prints.

*Example 4*

An aqueous solution having good stability and well suited for printing purposes when thickened with a gum thickener is produced by dissolving 4 parts of the stable aromatic diazonium salt of Example 1, 4 parts of sodium xylene sulfonate, and 0.2 part of citric acid in 16 parts of water. On the other hand, 4 parts of said salt are not soluble in even 25 parts of water, in the absence of sodium xylene sulfonate, forming a slurry.

*Example 5*

4 parts of the diazonium salt of Example 1 are mixed in 20 parts of water with 4 parts of (a) sodium xylene sulfonate, (b) sodium naphthalene-1,6-disulfonate, and (c) sodium naphthalene-1,3,6-trisulfonate. (a) forms a clear solution while (b) and (c) contain undissolved matter.

*Example 6*

4 parts of the diazonium salt of Example 1 and 0.2 part of citric acid are mixed in 19.5 parts of water and 0.5 part of a non-ionic surface active polyoxyethylene ether of a higher fatty alcohol with (a) 5 parts of sodium xylene sulfonate, and (b) 5 parts of sodium benzene sulfonate.

(a) forms a clear solution which is not affected by addition of 30 parts of water thereto, whereas (b) forms a slurry which remains the same upon addition of 30 parts of water thereto.

This invention has been disclosed with respect to certain preferred embodiments, and various modifications and variations thereof will become obvious to persons skilled in the art. It is to be understood that such modifications and variations are to be included within the spirit and purview of this application and the scope of the appended claims.

I claim:

1. A composition comprising a stable aromatic diazonium salt and about 1 to 120% by weight thereof of sodium xylene sulfonate.

2. A dry solid composition comprising a stable aromatic diazonium salt and about 1 to 120% by weight thereof of sodium xylene sulfonate.

3. An aqueous solution containing a stable aromatic diazonium salt and about 1 to 120% by weight thereof of sodium xylene sulfonate.

4. A composition comprising a stable aromatic diazonium salt, about 1 to 120% by weight thereof of a sodium xylene sulfonate, and an acidic substance in an amount effective to maintain an aqueous solution of the composition at a pH of from about 3 to 7.

5. A composition comprising the zinc chloride double salt of anthraquinone-1-diazonium chloride and about 1 to 120% thereof of sodium xylene sulfonate.

6. A composition comprising the zinc chloride double salt of anthraquinone-1-diazonium chloride, about 1 to 120% by weight thereof of sodium xylene sulfonate and an acidic substance in an amount effective to maintain an aqueous solution of the composition at a pH of from about 3 to 7.

7. A composition as defined in claim 6 wherein said acidic substance is citric acid.

8. A process for increasing the water solubility of a stable aromatic diazonium salt, comprising admixing said salt with about 1 to 120% by weight thereof of sodium xylene sulfonate.

9. A process for increasing the water solubility of a stable aromatic diazonium salt comprising admixing said salt with about 1 to 120% by weight thereof of sodium xylene sulfonate and an acidic substance in an amount effective to maintain an aqueous solution of the mixture at a pH of form about 3 to 7.

10. A process for increasing the water solubility of the zinc chloride double salt of anthraquinone-1-diazonium chloride comprising admixing therewith about 1 to 120% by weight thereof of sodium xylene sulfonate.

11. A process for increasing the water solubility of the zinc chloride double salt of anthraquinone-1-diazonium chloride comprising admixing therewith about 1 to 120% by weight thereof of sodium xylene sulfonate and an acidic substance in an amount effective to maintain an aqueous solution of the mixture at a pH of from about 3 to 7.

12. A process as defined in claim 11 wherein said acidic substance is citric acid.

References Cited in the file of this patent

UNITED STATES PATENTS 1,758,912   Keller _____ May 13, 1930

FOREIGN PATENTS 123,637   Switzerland _____ Dec. 1, 1927
21,227    Great Britain _____ 1894

OTHER REFERENCES

"Use of Hydrotropic Solutions in Ind.," Ralph H. McKee, Ind. and Eng. Chem., vol. 38, No. 4, p. 382 (April 1946).

Schwartz: Surface Active Agents and Detergents, vol. II, Intersci. Pub. Inc., N.Y., 1958, pp. 312–313; vol. I, 1949, p. 308.

UNITED STATES PATENT OFFICE
CERTIFICATION OF CORRECTION

Patent No. 2,946,648                     July 26, 1960

Clemens Streck

It is hereby certified that error appears in the above numbered patent requiring correction and that the said Letters Patent should read as corrected below.

Column 4, line 49, for "a" read -- of --.

Signed and sealed this 30th day of May 1961.

(SEAL)
Attest:

ERNEST W. SWIDER
Attesting Officer

DAVID L. LADD
Commissioner of Patents